Re. 24783
Jan. 3, 1956
R. P. HUMPHREY
2,729,266
APPARATUS AND METHOD FOR MAKING SPIRALLY
CORRUGATED METAL TUBES
Filed Nov. 24, 1952
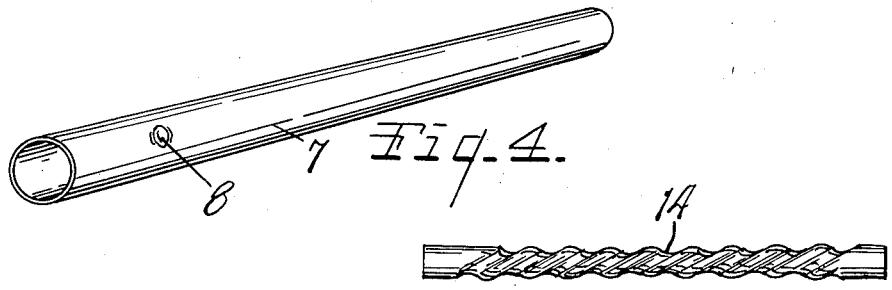
Fig. 4.
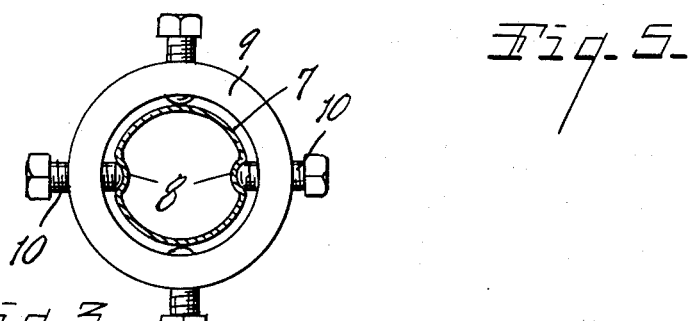
Fig. 5.
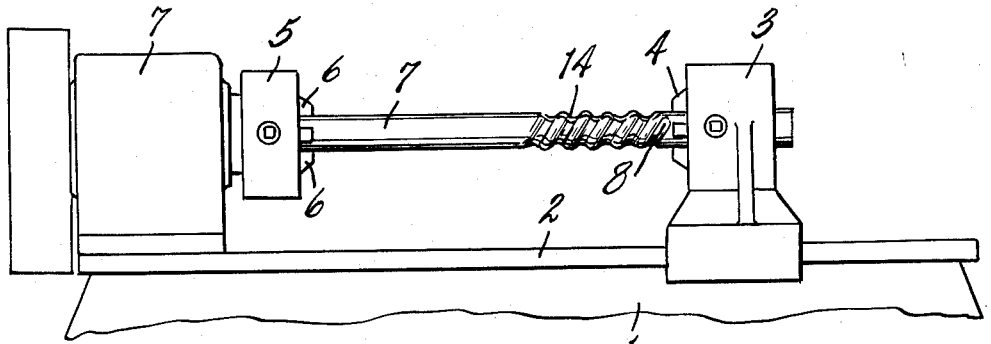
Fig. 3.
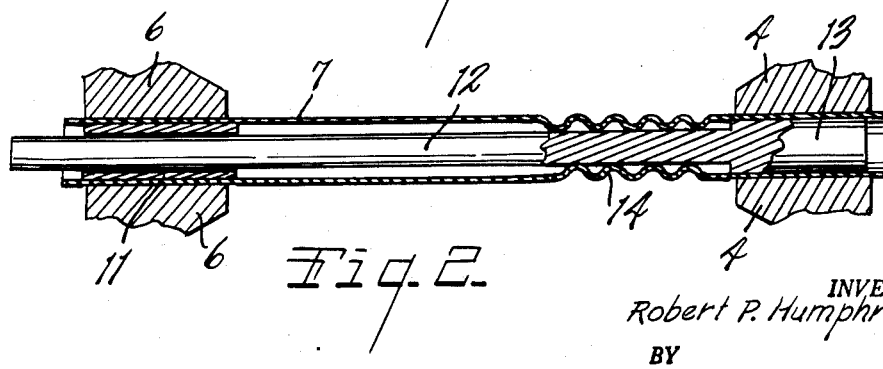
Fig. 1.
Fig. 2.
INVENTOR.
Robert P. Humphrey
BY
Otos A. Earl

United States Patent Office 2,729,266
Patented Jan. 3, 1956

2,729,266

APPARATUS AND METHOD FOR MAKING SPIRALLY CORRUGATED METAL TUBES

Robert P. Humphrey, Kalamazoo, Mich., assignor to General Gas Light Company, Kalamazoo, Mich.

Application November 24, 1952, Serial No. 322,252

8 Claims. (Cl. 153—71)

This invention relates to improvements in apparatus and method for making spirally corrugated metal tubes.

The main objects of this invention are:

First, to provide an apparatus for making spirally corrugated tubes from tubular metal stock which enables the rapid production of a uniform product.

Second, to provide an apparatus for making spirally corrugated metal tubes without the use of forming dies or tools.

Third, to provide a method of making spirally corrugated tubes from tubular metal stock which may be practiced very economically.

Fourth, to provide a method of making spirally corrugated tubes capable of being flexed or bent and without subjecting the walls of the tube to substantially weakening stresses.

Objects relating to details and economies of the invention will appear from the description to follow. The invention is defined and pointed out in the claims.

A preferred embodiment of the invention is illustrated in the accompanying drawing, in which:

Fig. 1 is a fragmentary side elevational view of an apparatus embodying my invention, parts thereof being shown conventionally. A partially completed tube being shown in operative position in the apparatus.

Fig. 2 is a fragmentary view partially in longitudinal section, the work shown in Fig. 1 being here shown in central longitudinal section.

Fig. 3 is an end view of a device for forming indentations in a tubular blank or stock as a step in the practice of my method.

Fig. 4 is a perspective view of a work blank or section of tubing with an indentation therein, the indenting being a step of my method following the providing of the tubular blank.

Fig. 5 is a side elevational view of a completed spirally corrugated tube.

The corrugated tube of my invention may be formed of steel, copper, aluminum or other metals or alloys and has a wide variety of uses. It may be bent or conformed without fracturing or kinking and thus adds greatly to its adaptability. It is desirable for use as a heat exchange element as its area is substantially greater than that of an uncorrugated tube. The walls of the tubes are not ruptured or the grain thereof rupturingly displaced, as is likely to result where corrugations are formed by the use of tools and dies. The apparatus illustrated in the accompanying drawing is simple, efficient and well adapted for the practice of my method.

In the accompanying drawing the mechanism illustrated is shown quite largely in conventional form and comprises a bed 1 having a slideway 2 thereon for the nonrotatable tail stock 3. The tail stock 3 is provided with a chuck having work clamping jaws indicated at 4. The details of the chuck are not illustrated.

The rotatable head stock 5 is provided with a work clamping chuck, the jaws of which are indicated at 6. The rotatable head stock is driven by suitable driving gears in the gear box 7. The details of the driving mechanism are not illustrated but may be that of known commercial types of lathes, and the chucks may also be conventional or known types of work clamping chucks. Therefore, I have not illustrated the details thereof.

In Fig. 4 I illustrate a work blank which is a section of metal tubing of uniform diameter and of uniform wall thickness from end to end. One or more dimple-like indentations 8 are formed in the tube desirably adjacent one end thereof.

In Fig. 3 I illustrate a device for conventionally forming such indentations. This consists of a ring 9 of a diameter exceeding that of the tube and provided with four angularly spaced screws 10 disposed in the same transverse plane. All of the screws are adjusted to center the tube within the ring and if a pair of indentations 8 are desired diametrically opposite screws are screwed inwardly to form the indentations. The other pair of screws act to support the work during this operation. The tubular blank thus prepared is inserted in the machine and its end having the dimples is clamped within the chuck of the nonrotating tail stock. The other end of the work blank clamped in the chuck of the rotatable head stock.

To prevent crushing or deforming the tube by the head stock chuck a bushing or internal sleeve 11 is disposed within the tube to internally support it in opposition to the chuck jaws 6. This sleeve or bushing also serves as a support for the mandrel 12 which is slidable therein. The mandrel is of uniform diameter from end to end and of substantially less diameter than the tubular blank. At its opposite end the mandrel is provided with a head or enlargement 13 removably fitting within the tube and interiorly supporting the walls thereof in opposition to the chuck jaws 4.

With the tubular stock mounted and supported as described the head stock is driven which imparts a torsional twisting stress to the tube and with the result the spiral corrugation 14 is formed therein beginning at and extending from the dimple toward the rotating head stock. The tail stock is, as stated, slidably mounted which permits it to travel toward the head stock to compensate for the shortening of the tube resulting from the forming of the corrugation therein.

In the structure illustrated in Figs. 1 and 2 only one indentation has been formed in the stock. Where more than one indentation is formed the flutes or corrugations corresponding in number to the indentations result. The completely corrugated tube shown in Fig. 5 may be readily bent or flexed even when formed of tubes of steel, brass or other alloys which are not bendably flexible.

The applicant's method does not require the use of forming tools or dies and the metal of the tube is not worked in the manner resulting from the use of forming tools or dies. The only forming tool applicant uses is the device for forming the indentation or indentations 8 and they may be formed by various means. However, the device shown in Fig. 3 is a practical and convenient way of the forming of uniform indentations.

The work is desirably clampingly and nonrotatably engaged by the tail stock chuck closely adjacent the indentation 8. The applicant's theory and understanding of the operation is that when torsional stress is applied to the tube the leading edge of the dimple or indentation tends to collapse radially inward under the torsion load or stress. This radial collapsing shortens the tube axially or applies axial tension at the leading edge of the dimple. The combination of torsional tension and axial tension results in a spirally applied tension to the stock that progressively applies the radial inward collapsing load in a spiral path resulting in the spiral corrugation.

The mandrel is an important factor not only in determining the depth of the corrugation but also in facilitating the forming of the spiral groove or corrugation and preventing collapsing of the tube as the forming of the corrugation progresses.

The above explanation is given as the applicant's understanding or analysis of what takes place in forming the spiral rib or corrugation.

I have illustrated and described an apparatus of the type I have successfully used in the practice of the method of my invention and an apparatus that has the advantage of simplicity and one that may be readily incorporated or embodied in a machine such as a lathe. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. The method of making spirally corrugated tubes comprising the steps of providing a metal tube of substantially uniform diameter and wall thickness from end to end thereof, forming a plurality of angularly and uniformly spaced dimple-like indentations in the wall of the tube adjacent one end thereof and in approximately the same transverse plane, supporting a mandrel having an elongated cylindrical portion of uniform and of substantially less diameter than the interior diameter of the tube centrally within the tube, nonrotatably externally and internally supporting the tube adjacent but at the outer side of the indentations therein while permitting longitudinal movement of the end of the tube so supported, and interiorly and externally supporting the wall of the tube at its other end and rotating the tube in one direction.

2. The method of making spirally corrugated tubes comprising the steps of providing a metal tube of substantially uniform diameter and wall thickness from end to end thereof, forming a dimple-like indentation in the wall of the tube adjacent one end thereof, supporting a mandrel having an elongated cylindrical portion of uniform and of substantially less diameter than the interior diameter of the tube centrally within the tube, nonrotatably externally and internally supporting the tube adjacent but at the outer side of the indentation therein while permitting longitudinal movement of the end of the tube so supported, and interiorly and externally supporting the wall of the tube at its other end and rotating the tube in one direction.

3. The method of making spirally corrugated tubes comprising the steps of providing a metal tube of substantially uniform diameter and wall thickness from end to end thereof, forming a plurality of angularly and uniformly spaced dimple-like indentations in the wall of the tube and in approximately the same transverse plane, supporting a mandrel of substantially less diameter than the interior diameter of the tube centrally within the tube, and nonrotatably supporting the tube at one end and supporting and rotating the other end with the indentations between the supports while permitting longitudinal contracting movement of the tube.

4. The method of making spirally corrugated tubes comprising the steps of providing a metal tube, forming a dimple-like indentation in the wall of the tube, supporting a mandrel of substantially less diameter than the interior diameter of the tube centrally within the tube, and nonrotatably supporting the tube at one end and supporting and rotating the other end with the indentation between the supports while permitting longitudinal contracting movement of the tube.

5. The method of making spirally corrugated tubes from uncorrugated tubular stock of substantially uniform diameter and wall thickness comprising, the steps of forming an indentation in the wall of the tube adjacent one end thereof and nonrotatably supporting the tube adjacent but at the outside of such indentation, supporting a mandrel of less diameter than the interior diameter of the tube centrally thereof, and rotating the tube by force applied to its other end while permitting longitudinal contracting movement of the tube as the corrugations are formed therein.

6. In an apparatus for making spirally corrugated metal tubes from uncorrugated tubular stock having at least one indentation therein, a rotatably driven head stock provided with a work clamping chuck, a supporting bushing adapted to be arranged within the work to interiorly support the wall thereof in opposition to the chuck, a slidably mounted nonrotatable tail stock aligned with said head stock and provided with a work clamping chuck, and a mandrel of less diameter than the interior diameter of the tubular stock and of substantially uniform diameter adapted to be disposed centrally within the work and slidably supported at one end by said bushing, said mandrel being provided at its other end with a supporting portion adapted to be disposed within and in interiorly supported relation to the wall of the work in opposition to the tail stock chuck.

7. In an apparatus for making spirally corrugated metal tubes from uncorrugated tubular stock having at least one indentation therein, a rotatably driven head stock provided with a work clamping chuck, a freely slidably mounted nonrotatable tail stock aligned with said head stock and provided with a chuck non-rotatably grippingly engageable with the tubular stock adjacent the indentation therein, and a mandrel of less diameter than the interior diameter of the tubular stock and of substantially uniform diameter adapted to be disposed centrally within the work.

8. In an apparatus for making spirally corrugated metal tubes from uncorrugated tubular stock having at least one dimple-like indentation therein of substantial depth, a rotatably driven head stock provided with a work clamping chuck, a freely slidably mounted nonrotatable tail stock aligned with said head stock and provided with a chuck non-rotatably grippingly engageable with the exterior of the tubular stock adjacent the indentation therein, and a mandrel of less diameter than the interior diameter of the tubular stock adapted to be disposed centrally within the work, said mandrel being provided with a supporting portion adapted to be disposed within and in interiorly supported relation to the wall of the work in opposition to the tail stock chuck, the space between said chucks being unobstructed whereby the exterior of the stock is unsupported as the corrugations are formed therein.

References Cited in the file of this patent

UNITED STATES PATENTS

| | | |
|---|---|---|
| 633,389 | Reynolds | Sept. 19, 1899 |
| 1,120,268 | Brinkman | Dec. 8, 1914 |
| 2,338,847 | Hansen | Jan. 11, 1944 |

FOREIGN PATENTS

| | | |
|---|---|---|
| 1,739 | Great Britain | of 1867 |